(12) United States Patent
Fischer et al.

(10) Patent No.: US 7,083,192 B2
(45) Date of Patent: Aug. 1, 2006

(54) AIR BAG MODULE VENT WITH RELEASABLE LATCH

(75) Inventors: Kurt F. Fischer, Oxford, MI (US); Charles S. Pillsbury, IV, Rochester, MI (US); William P. Braun, Romeo, MI (US); Bruce R. Hill, Bloomfield Hills, MI (US); Neal H. Delventhal, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 113 days.

(21) Appl. No.: 10/601,981

(22) Filed: Jun. 23, 2003

(65) Prior Publication Data

US 2004/0051286 A1 Mar. 18, 2004

Related U.S. Application Data

(63) Continuation-in-part of application No. 10/244,933, filed on Sep. 16, 2002.

(51) Int. Cl.
*B60R 21/28* (2006.01)

(52) U.S. Cl. .................................... 280/739; 280/743.2
(58) Field of Classification Search ................ 280/736, 280/739, 742, 743.2
See application file for complete search history.

(56) References Cited

U.S. PATENT DOCUMENTS

| | | | |
|---|---|---|---|
| 5,246,250 A | 9/1993 | Wolanin et al. | |
| 5,366,242 A | 11/1994 | Faigle et al. | |
| 5,405,166 A | 4/1995 | Rogerson | |
| 5,489,117 A | 2/1996 | Huber | |
| 5,586,783 A | 12/1996 | Adam et al. | |
| 5,664,802 A | 9/1997 | Harris et al. | |
| 5,695,214 A | 12/1997 | Faigle et al. | |
| 5,709,405 A | 1/1998 | Saderholm et al. | |
| 5,743,558 A | 4/1998 | Seymour | |
| 5,762,367 A * | 6/1998 | Wolanin ..................... 280/736 |
| 5,853,192 A | 12/1998 | Sikorski et al. | |
| 5,899,494 A | 5/1999 | Lane, Jr. | |
| 5,918,901 A | 7/1999 | Johnson et al. | |
| 5,927,753 A | 7/1999 | Faigle et al. | |
| 5,957,490 A | 9/1999 | Sinnhuber | |
| 6,039,346 A | 3/2000 | Ryan et al. | |
| 6,082,765 A | 7/2000 | Bowers et al. | |

(Continued)

FOREIGN PATENT DOCUMENTS

DE 196 40 322 A1 3/1998

(Continued)

Primary Examiner—Paul N. Dickson
Assistant Examiner—Laura B Rosenberg
(74) Attorney, Agent, or Firm—Tarolli, Sundheim, Covell & Tummino LLP

(57) ABSTRACT

An apparatus (10) includes an inflatable vehicle occupant protection device (12) and a vent opening (44) for directing flow of inflation fluid away from the protection device. A vent member (46) is movable between an open condition enabling flow of inflation fluid through the vent opening and a closed condition at least partially blocking flow of inflation fluid through the vent opening. A tether (50), when tensioned, moves the vent member (46) from the open condition to the closed condition. A latch (48) has a latched condition for maintaining the vent member (46) in the closed condition and an unlatched condition for enabling the vent member to move away from the closed condition. A controller (102) is operative to actuate the latch (48). selectively to the latched condition and the unlatched condition based on at least one sensed occupant condition.

21 Claims, 4 Drawing Sheets

U.S. PATENT DOCUMENTS

| | | | |
|---|---|---|---|
| 6,123,358 A | 9/2000 | Ryan et al. | |
| 6,158,770 A | 12/2000 | Ryan et al. | |
| 6,161,866 A | 12/2000 | Ryan et al. | |
| 6,189,928 B1 * | 2/2001 | Sommer et al. | 280/743.2 |
| 6,206,408 B1 * | 3/2001 | Schneider | 280/728.1 |
| 6,213,502 B1 | 4/2001 | Ryan et al. | |
| 6,241,279 B1 | 6/2001 | Ochiai | |
| 6,247,726 B1 | 6/2001 | Ryan | |
| 6,308,983 B1 | 10/2001 | Sinnhuber | |
| 6,357,791 B1 | 3/2002 | Faigle et al. | |
| 6,439,603 B1 | 8/2002 | Damman et al. | |
| 6,454,300 B1 * | 9/2002 | Dunkle et al. | 280/742 |
| 6,513,835 B1 * | 2/2003 | Thomas | 280/743.2 |
| 6,648,371 B1 * | 11/2003 | Vendely et al. | 280/739 |
| 6,669,231 B1 * | 12/2003 | Ryan | 280/736 |
| 6,789,819 B1 * | 9/2004 | Husby | 280/735 |
| 6,793,243 B1 * | 9/2004 | Husby | 280/735 |
| 6,799,777 B1 * | 10/2004 | Hawthorn et al. | 280/742 |
| 6,814,372 B1 * | 11/2004 | Kang et al. | 280/740 |
| 6,825,654 B1 * | 11/2004 | Pettypiece et al. | 324/166 |
| 6,832,778 B1 * | 12/2004 | Pinsenschaum et al. | 280/739 |
| 2004/0164533 A1 * | 8/2004 | Pettypiece, Jr. | 280/735 |

FOREIGN PATENT DOCUMENTS

| | | |
|---|---|---|
| EP | 8 127 741 B1 | 3/1997 |
| EP | 1 398 228 A2 | 3/2004 |
| JP | 05330395 A | 12/1993 |

* cited by examiner

AIR BAG MODULE VENT WITH RELEASABLE LATCH

RELATED APPLICATIONS

This application is a continuation-in-part of U.S. patent application Ser. No. 10/244,933, filed Sep. 16, 2002.

BACKGROUND OF THE INVENTION

The present invention relates to a vehicle occupant protection apparatus. In particular, the present invention relates to an air bag module including a vent with a vent door that is moved between an open condition and a closed condition by a tether of an air bag.

DESCRIPTION OF RELATED ART

It is known to provide an air bag with a vent. The vent is operative, when the air bag inflates to help protect a vehicle occupant, to discharge inflation fluid from the air bag. In some air bags, the vent may be selectively opened depending on sensed factors, for example, whether the occupant's seat belt is buckled. In other air bags, such as the one shown in U.S. Pat. No. 5,405,166, the vent is formed as two openings that are initially aligned so that the vent is initially open and then closes after the internal bag pressure reaches a predetermined amount. U.S. Pat. No. 5,246,250 shows an air bag that includes a tether attached to a valve flap panel to open or close a vent opening in the air bag when the air bag is inflated and the tether is actuated.

SUMMARY OF THE INVENTION

The present invention relates to an apparatus that includes an inflatable vehicle occupant protection device inflatable to deploy from a deflated condition to an inflated condition. A vent opening directs flow of inflation fluid away from the protection device. A vent member is movable relative to the vent opening between an open condition enabling flow of inflation fluid away from the protection device through the vent opening and a closed condition at least partially blocking flow of inflation fluid away from the protection device through the vent opening. A member is associated with the protection device and the vent member. The member is operative to move the vent member from the open condition to the closed condition upon deployment of the protection device. Latching means has a latched condition for maintaining the vent member in the closed condition and an unlatched condition for preventing the vent member from remaining in the closed condition. Control means is operative to actuate the latching means selectively to the latched condition and the unlatched condition based on at least one sensed occupant condition.

The present invention also relates to a vehicle occupant protection apparatus including an inflatable vehicle occupant protection device inflatable to deploy from a deflated condition to an inflated condition. A vent opening enables flow of inflation fluid away from the protection device. A vent member is movable relative to the vent opening between an open condition enabling flow of inflation fluid away from the protection device through the vent opening and a closed condition at least partially blocking flow of inflation fluid away from the protection device through the vent opening. A tether is connected to the protection device. The protection device pulls on the tether during inflation and deployment. Connecting means including a velocity mechanism is operable to release the tether for movement relative to the vent member when the tether is pulled at a velocity below a predetermined velocity. The velocity mechanism is further operable to lock the tether against movement relative to the vent member when the tether is pulled at a velocity at or above the predetermined velocity. The tether is operative to move the vent member from the open condition to the closed condition when the protection device pulls on the tether and the velocity mechanism locks the tether.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

The present invention relates to a vehicle occupant protection apparatus. In particular, the present invention relates to an air bag module having a vent that is moved between an open condition and a closed condition by a tether of an air bag. The vent is held in the closed condition by a latch mechanism that is selectively releasable depending on sensed conditions.

Figure 1:
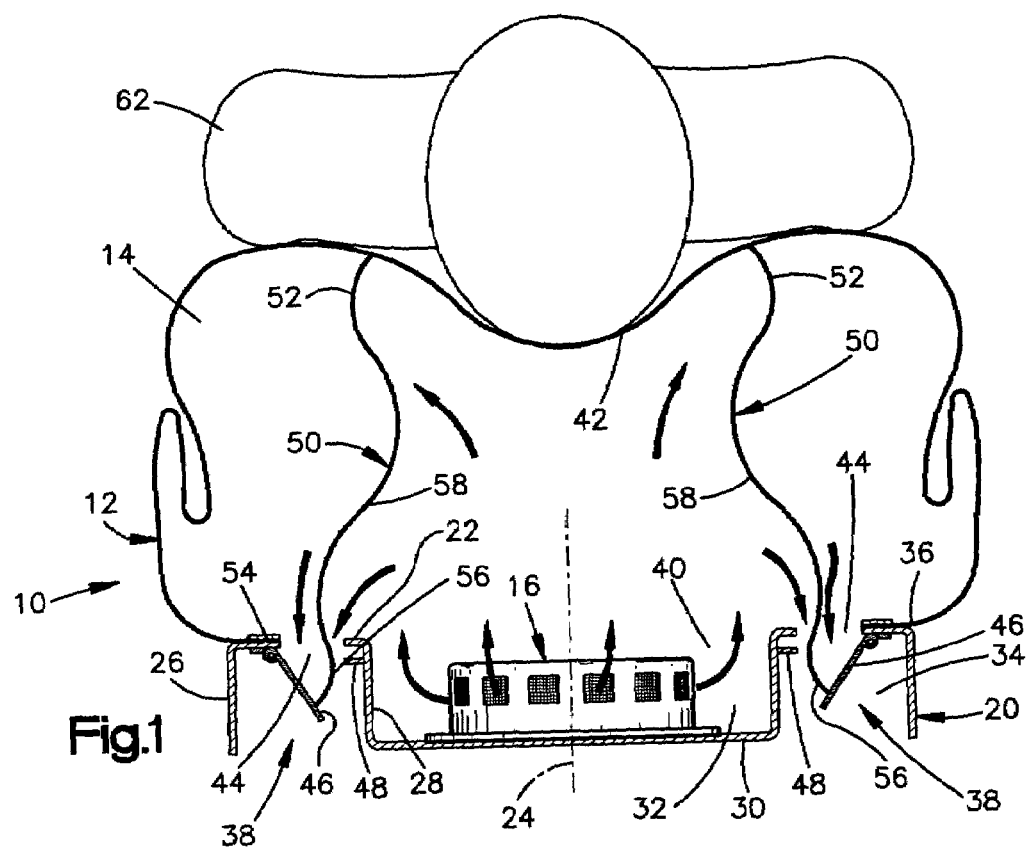
FIG. 1 is a sectional view of a portion of a vehicle occupant protection apparatus including an inflatable driver side protection device and a vent in accordance with the present invention, with the vent being in an open condition.
Figure 2:
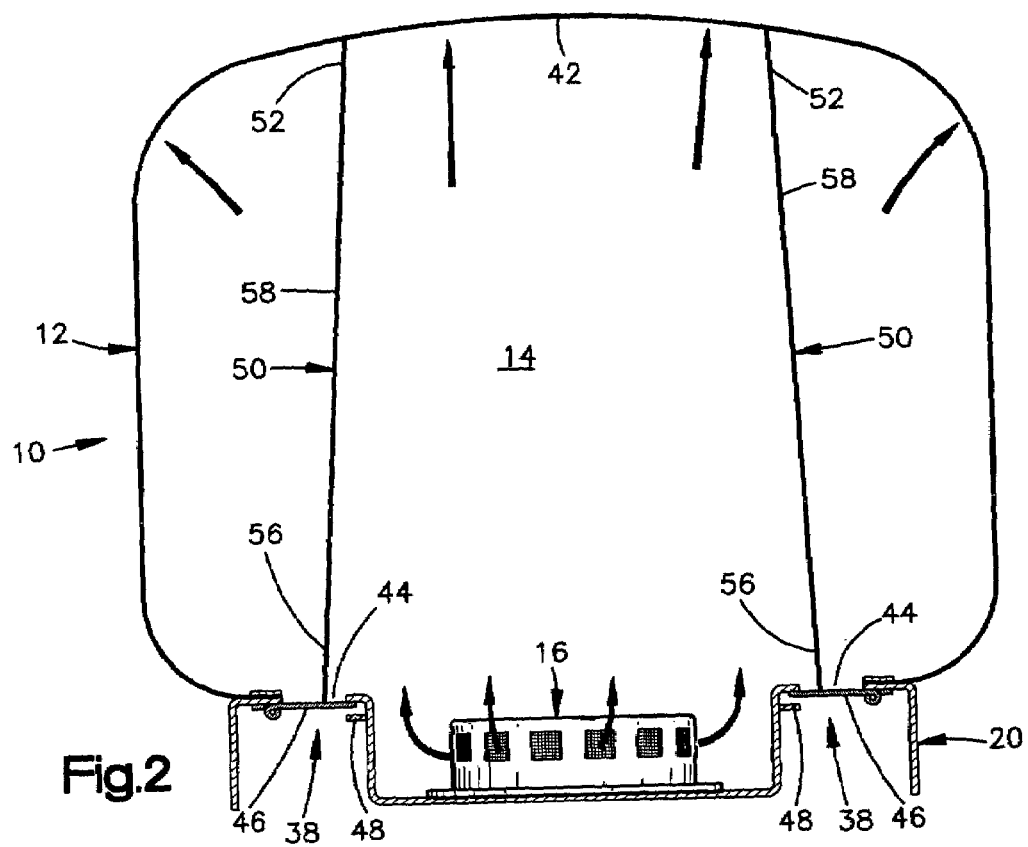
FIG. 2 is a view similar to FIG. 1 showing the apparatus with the vent in a closed condition.

As representative of the invention, FIGS. 1 and 2 illustrate schematically an air bag module 10 that includes an inflatable occupant protection device in the form of an air bag 12. Other vehicle occupant protection devices that can be used in accordance with the invention include, for example, inflatable seat belts, inflatable knee bolsters, inflatable head liners, inflatable side curtains, and knee bolsters operated by inflatable air bags.

The air bag module 10 of the illustrated embodiment is a front impact air bag module mountable on a driver side or passenger side of a vehicle. For example, in a driver side implementation, the air bag module 10 may be mounted on a steering wheel of the vehicle. In a passenger side implementation, the air bag module 10 may be mounted in an instrument panel of the vehicle.

The air bag 12 is preferably made from a flexible fabric material, such as woven nylon, and has an inflation fluid volume 14. The air bag 12 can alternatively be made from a non-woven material, such as plastic film.

The module 10 includes an inflator 16 for inflating the air bag 12. The inflator 16 may contain a stored quantity of pressurized inflation fluid and an ignitable material for heating the inflation fluid. The module 10 alternatively could include an inflator 16 that uses the combustion of gas generating material to generate inflation fluid in the form of gas to inflate the air bag 12. As another alternative, the inflator 16 may contain only a stored quantity of pressurized inflation fluid for inflating the air bag 12. As a further alternative, the inflator 16 may have any known configuration suitable for providing inflation fluid for inflating the air bag 12.

The inflator 16 and the air bag 12 are supported on a support member 20. The support member 20 is a member or assembly that is fixed in position on the vehicle, that supports the inflator 16 and the air bag 12, and that receives the reaction forces of the inflator and the air bag when the inflator is actuated. In the illustrated embodiment, the support member 20 is a reaction plate.

The reaction plate 20 is a single piece of material, such as metal or high strength plastic, that is formed to the illustrated configuration. The reaction plate 20 has a main body portion 22 centered on an axis 24. A rim or outer wall 26 of the reaction plate 20 extends downward (as viewed in FIG. 1) from the main body portion 22. An inner wall 28 of the reaction plate 20 extends downward from the main body portion 22 and parallel to the outer wall 26, at a location spaced inward from the outer wall 26. A center wall 30 caps the inner wall 28.

The inner wall 28 and the center wall 30 of the reaction plate 20 define an inflator mounting chamber 32. The inflator 16 is located in the chamber 32 and is secured to the reaction plate 20 in a manner not shown. The inner wall 28 and the outer wall 26 of the reaction plate 20 define a vent chamber 34 positioned outward of the inflator mounting chamber 32.

A mouth portion 36 of the air bag 12 is secured to the main body portion 22 of the reaction plate 20 by a retainer or retainer ring 54. The mouth portion 36 defines an inflation fluid opening 40 for receiving inflation fluid from the inflator 16. The inflation fluid opening 40 allows inflation fluid to flow from the inflator 16 into the inflation fluid volume 14 of the air bag 12 when the inflator is actuated. Opposite the mouth portion 36, the air bag 12 has an outer panel 42 that is located distant from the reaction plate 20 when the air bag is inflated.

The air bag module 10 also includes inflation fluid vents 38. In the embodiment illustrated in FIGS. 1 and 2, the air bag module 10 includes two vents 38. The module 10 could, however, include more or fewer vents 38, which could be positioned differently than illustrated. The two vents 38 illustrated in FIGS. 1 and 2 are identical. Each vent 38 includes a vent opening 44 and a vent member 46. The vent members 46 are operative selectively to close their respective vent opening 44.

The vent openings 44 are formed in the main body portion 22 of the reaction plate 20 and are positioned inward of the mouth portion 36 of the air bag 12. The vent openings 44 are identical to each other, each having a generally rectangular configuration. The vent openings 44 could, however, have configurations other than a rectangular configuration, and if plural vents 38 are provided, they could have configurations different from each other.

Because the vent openings 44 are located in the main body portion 22 of the reaction plate 20 inward of the mouth portion 36 of the air bag 12, the vent openings are in fluid communication with the inflation fluid volume 14 of the air bag. As a result, at least some of the inflation fluid flowing from the inflator 16, when the inflator is actuated, flows across or into the vent openings 44 in the reaction plate 20.

Each vent member 46 is configured as a rectangular door that is supported on the reaction plate 20 for pivotal movement relative to the reaction plate. The door 46 is pivotally mounted to the reaction plate at a location adjacent the mouth portion 36 of the air bag 12. The module 10 includes latch mechanisms shown schematically at 48 on the inner wall 28 of the reaction plate 20, adjacent each vent opening 44. Each latch mechanism 48 is actuatable to a latched condition (see FIGS. 3A and 3B) and an unlatched condition (see FIG. 3C). The latch mechanism 48 will be described in further detail below.

Each door 46 has a first condition shown in FIG. 1 in which the door is spaced apart from the vent opening 44 in the reaction plate 20. When the door 46 is in the first condition, the door is pivoted away from the vent opening 44 and away from the inflation fluid volume 14 of the air bag 12 (downward as viewed in FIG. 1), into the vent chamber 34 in the reaction plate 20. When the door 46 is in the first condition, the vent 38 is in an open condition and the vent opening 44 is not blocked. Inflation fluid can thus flow away from the air bag 12 through the vent opening 44 of the vent 38.

Each door 46 has a second condition shown in FIG. 2 in which the door is pivoted upward and overlies the vent opening 44 in the reaction plate. The latch mechanism 48 when in the latched condition holds the door 46 in the second or closed condition. When the door 46 is in the closed condition, the vent 38 is in a closed condition and the vent opening 44 is at least partially blocked. This helps block inflation fluid from flowing away from the air bag 12 through the vent opening 44 of the vent 38.

The module 10 includes one or more tethers 50 for controlling or limiting deployment of the air bag 12. In the illustrated embodiment, two identical tethers 50 are provided, each corresponding to a respective one of the vents 38 and, more particularly, to a respective one of the vent doors 46. The tethers 50 in accordance with the present invention may take any one of many different forms. In the illustrated embodiment, each tether 50 is a narrow, elongate piece or strip of fabric material having a width of from about one-half inch to about two inches. The tether 50 may be made from the same material as the air bag 12 or may be made from a different material. The tethers 50 are not, per se, part of the air bag 12, in the sense that the air bag can deploy and inflate regardless of whether the tethers are present or not.

Each tether 50 has a first end portion 52 that is fixed to the outer panel 42 of the air bag 12 by means (not shown), such as sewing. The first end portion 52 of the tether 50 is thus connected for movement with the air bag 12 as the air bag is deployed.

An opposite second end portion 56 of each tether 50 is connected with or fixed to its respective vent door 46. The tethers 50, when tensioned by the air bag 12, transfer tensile force from the air bag and the tethers to their respective vent doors 46. The second end portions 56 of the tethers 50 may be formed as loops that extends through or around a portion of their respective doors 46 to couple the doors for movement with the second end portions of the tethers. The second end portions 56 of the tethers 50 may be secured to the vent doors 46 in another manner, for example, by adhesive. Each tether 50 includes an intermediate portion 58 that extends between and interconnects its first and second end portions 52 and 56.

When the air bag 12 is in a deflated condition (not shown), the outer panel 42 of the air bag is close to or adjacent the mouth portion 36. There is a significant amount of slack in the tethers 50. The slack is present because the length of each tether 50 is greater than the distance between the portion of the air bag 12 where the first end portion 52 of the tether is fixed to the outer panel 42 and the location on the vent door where the second end portion 56 of the tether is connected to the door. In the illustrated embodiment, the slack is provided by the intermediate portions 58 of the tethers 50. Because of the presence of the slack, the vent doors 46 are not pulled closed against the reaction plate 20 when the air bag 12 is in the deflated condition, and inflation fluid may be able to flow away from the air bag through the vent openings 44.

If the air bag 12 is to be inflated, an actuation signal is transmitted to the inflator 16. When the inflator 16 is actuated, it emits a large volume of inflation fluid through the mouth portion 36 of the air bag 12 and into the inflation fluid volume 14 of the air bag. The air bag 12 inflates, as shown in FIGS. 1 and 2.

As the air bag 12 inflates, the outer panel 42 of the air bag moves away from the reaction plate 20 and the vent doors 46. Referring to FIG. 1, when the air bag 12 is inflated, the outer panel 42 may move away from the reaction plate 20 by less than a predetermined distance. This might happen, for example, if the air bag 12 when inflating contacts a vehicle occupant (as shown schematically at 62 in FIG. 1) positioned relatively close to the reaction plate 20.

The engagement of the air bag 12 with the relatively close vehicle occupant 62 stops or limits outward movement of the outer panel 42 of the air bag. When this occurs, the tethers 50 are not stretched out sufficiently to remove the slack from the tethers. The tethers 50 do not pull on the vent doors 46, and the vent doors remain in the first condition, spaced apart from the vent openings 44. The vent openings 44 thus remain open, enabling flow of inflation fluid away from the air bag 12 through the vent openings. This venting of the air bag 12 can reduce the force and pressure with which the air bag inflates.

Referring to FIG. 2, when the air bag 12 is inflated, the outer panel 42 may move away from the reaction plate 20 by a predetermined amount. Such movement might occur if the air bag 12 inflates fully to help protect a vehicle occupant seated against the vehicle seat back. This movement of the outer panel 42 away from the reaction plate 20 by the predetermined amount causes the tethers 50 to be tensioned, as shown in FIG. 2. As the distance between the first and second end portions 52 and 56 of the tethers 50 increases, the slack is pulled out of the tethers and the tethers pull the vent doors 46 to the second or closed condition shown in FIG. 2. The vent openings 44 are thus closed, blocking flow of inflation fluid away from the air bag 12 through the vent openings. If the latch mechanisms 48 are in the latched condition when the vent doors 46 are closed, the latch mechanisms latch the doors closed and the air bag 12 inflates with full force and pressure.

According to the present invention, the latch mechanisms 48 are selectively actuatable between the unlatched and latched conditions and thus may selectively release the vent doors 46 to move from the closed condition (FIG. 2) to the open condition (FIG. 1). The latch mechanisms 48 are shown in greater detail in FIGS. 3A–3C.

The latch mechanism 48 includes a latch member 60 connected to a shaft 62 of an actuator 64. Actuation of the actuator 64 is initiated by a signal provided to the actuator from a controller (not shown) via lead wires 74. Operation of the controller is described below.

Figure 3A:
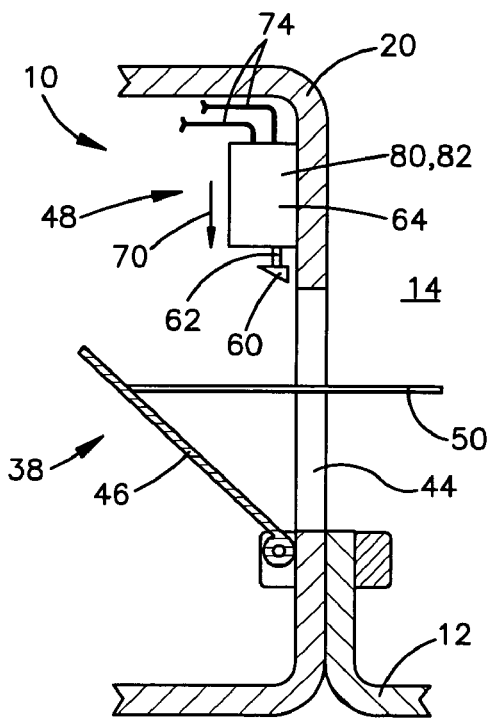
FIGS. 3A–3C are magnified views of a portion of the apparatus of FIGS. 1 and 2 with parts shown in different positions, according to a first embodiment of the present invention.
Figure 3B:
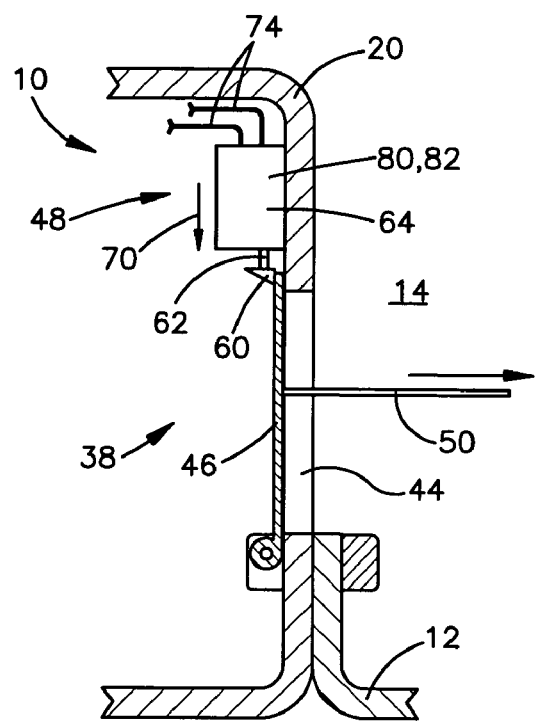
Figure 3C:
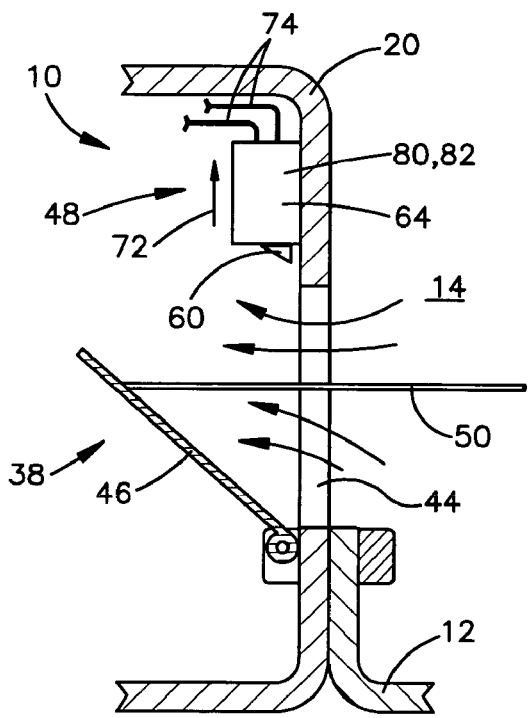

When the latch mechanism 48 is actuated to the latched condition, the shaft 62 is moved in a first direction, downward as viewed in FIGS. 3A–3C, to the latched position illustrated in FIGS. 3A and 3B. The first direction is indicated generally by the arrow 70 in FIGS. 3A and 3B. When the actuator 64 is actuated to the unlatched condition, the shaft 62 is moved in a second direction, opposite the first direction and upward as viewed in FIGS. 3A–3C, to the unlatched position illustrated in FIG. 3C. The second direction is indicated generally by the arrow 72 in FIG. 3C.

If the latch mechanism 48 is in the latched condition when the vent door 46 moves from the opened condition (FIG. 3A) toward the closed condition (FIG. 3B), the door engages the latch member 60 and urges the member in the second direction 72. The vent door 46 displaces the latch member 60 and slides past the latch member to the closed condition of FIG. 3B. Once the door 46 moves beyond the latch member 60, the latch member returns to the latched condition of FIG. 3B. The vent door 46 is thus locked in the closed condition and blocks inflation fluid flow through the vent opening 44.

If the latch mechanism 48 is in the unlatched condition when the vent door 46 moves from the opened condition (FIG. 3A) toward the closed condition (FIG. 3C), the latch member does not latch the door in the closed position. The latch mechanism 48, when in the unlatched condition of FIG. 3C, helps prevent the vent door 46 from remaining in the closed condition. When the latch mechanism 48 is in the unlatched condition, inflation fluid pressure in the air bag 12 urges the door 46 to the opened condition. The inflation fluid in the air bag 12 may thus flow from the inflation fluid volume 14 through the vent opening 44, as indicated by the arrows in FIG. 3C.

According to the present invention, the actuator 64 may have a variety of configurations. For example, the actuator 64 may comprise a solenoid 80 actuatable to move the shaft 62 and latch member 60 between the latched condition (FIGS. 3A and 3B) and the unlatched condition (FIG. 3C). In this configuration, the solenoid 80 is actuatable by an electrical actuating signal provided via the lead wires 74.

As another example, the actuator 64 may comprise a solenoid 80 in which the shaft 62 and latch member 60 are spring biased in the first direction 70 to the latched condition. The solenoid 80 is actuatable by an electrical actuating signal provided via the lead wires 74 to move the shaft 62 and latch member 60 in the second direction 72 to the unlatched condition. The latch member 60 is thus maintained in the unlatched condition as long as the actuating signal is present.

As another example, the solenoid 80 may be a latching solenoid. In this configuration, once the shaft 62 and latch member 60 are moved to the latched or unlatched condition, they are maintained in that respective condition mechanically. As a result, a pulsed actuating signal is sufficient to actuate the solenoid 80 to move the latch member 60 to the unlatched condition and maintain the member in the unlatched condition. Likewise, another pulsed actuating signal is sufficient to actuate the solenoid to move the latch member to the latched condition and maintain the member in the latched condition.

As a further example, the actuator 64 may comprise a piston actuator 82, in which the shaft 62 is operatively connected to a piston (not shown) slidable in a cylinder. The piston is actuatable to move the shaft 62, and thus the latch member 60 to the actuated and unactuated conditions. In such a configuration, the piston may be actuatable hydraulically, pneumatically, or pyrotechnically.

Those skilled in the art will appreciate that the latch mechanism 48 may have configurations alternative to those described above. For example, the latch mechanism 48 could include a permanent magnet for latching the vent door 46 in the closed condition. This configuration may include an electromagnet that, when energized, produces a magnetic field that overcomes or cancels the magnetic field of the permanent magnet, thereby to release the vent door 46 to move to the opened condition.

Figure 4:
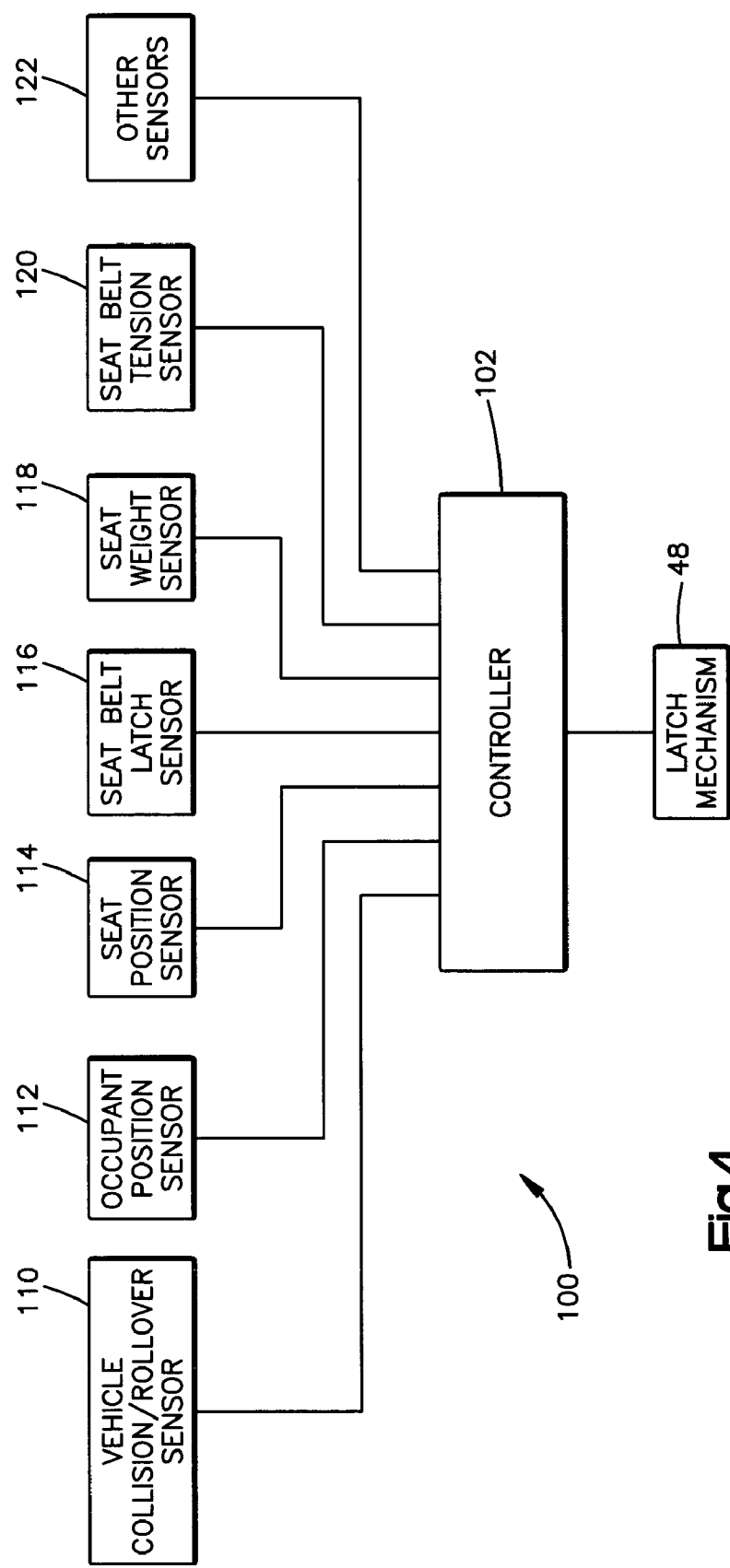
FIG. 4 is a block diagram illustrating a vehicle safety system of the present invention.

According to the present invention, the air bag module 10 is implemented in a vehicle occupant protection system for helping to protect an occupant of a vehicle. Referring to FIG. 4, the vehicle occupant safety system 100 includes a controller 102 operatively connected to the latch mechanism 48 by the lead wires 74.

The controller 102 is operatively connected to a variety of sensors for sensing various conditions of the vehicle and/or vehicle occupant. As shown in FIG. 4, these sensors may include vehicle collision and/or rollover sensors 110, occupant position sensors 112, seat position sensors 114, seat belt latch sensors 116, seat weight sensors 118, seat belt tension sensors 120, or any other sensors 122 that may be useful in determining whether to release the vent door to the opened condition.

As stated above, the controller 102 is operative to actuate the latch mechanism 48 selectively between the unlatched condition and the latched condition based on sensed occupant and/or vehicle conditions. Generally speaking, based on the sensed vehicle and occupant conditions, the controller 102 determines the appropriate pressure to which to inflate the air bag 12. If the controller 102 determines the need to maintain a relatively high inflation pressure for the air bag, the controller is operative to maintain the vent door 46 latched closed to help prevent inflation fluid from venting from the air bag 12. If the controller 102 determines the need to provide a lower inflation pressure for the air bag, the controller is operative to release the vent door 46 to open so that inflation fluid vents from the air bag 12. The controller 102 may also be operative to initially latch the vent door 46 to maintain a relatively high inflation pressure and subsequently release the vent door to open and release inflation fluid.

For example, in a situation where the occupant is positioned away from the normal seated position, the configuration of the tethers 50 may inherently control closing of the vent doors 46. This may be the case, for example, where the occupant is leaned forward close to the air bag module 10. In this situation, the occupant may impede deployment of the air bag 12. This may prevent tensioning of the tethers 50, in which case the tethers would not pull the vent door 46 to the closed condition. Therefore, in this situation, air bag module 10 may function passively to cause the vent door 46 to remain in the opened condition.

The occupant could, however, be positioned away from the normal seated position and yet the tethers 50 still function to pull the vent door 46 to the closed condition. This may be the case, for example, where the occupant is leaned to the side of the air bag module 10. In this situation, the position of the occupant may be determined by the occupant position sensors 112. In this situation, the controller 102 may be operative to actuate or maintain the latch mechanism 48 to the unlatched condition, thus releasing the vent doors 46 to vent inflation fluid from the air bag 12 (see FIG. 1).

As another example, the occupant may be in the normal seated position but not restrained by the vehicle seat belt. This situation may be determined via the seat belt latch sensor 116 and the occupant position sensor 112. If this situation is detected, the controller 102 may be operative to actuate or maintain the latch mechanism 48 in the latched condition. This prevents inflation fluid from venting, which allows the air bag 12 to inflate fully and remain inflated throughout the duration of the collision. As a result, the air bag 12 may provide a high level of energy absorption for helping to restrain the unbelted occupant.

As a further example, the occupant may be in the normal seated position and restrained by the vehicle seat belt. This situation may be determined via the seat belt latch sensor 116. If this situation is detected, the controller 102 may be operative to actuate or maintain the latch mechanism 48 in the unlatched condition. This releases the vent doors 46 to vent inflation fluid from the air bag 12. This permits inflation fluid to vent from the air bag 12, which provides a ride down effect.

Those skilled in the art will appreciate that situations other than those set forth above may be sensed and used by the controller 102 to control operation of the latch mechanism 48. It will also appreciated that the other sensors, i.e., the seat position sensor 114, seat weight sensor 118, seat belt tension sensor 120, and other sensors 122, may provide information that the controller 102 may use to control actuation of the latch mechanism 48 further. For example, information provided by the seat position sensor 114 and seat weight sensor 118 and seat belt tension sensor 120 may be used by the controller 102 to help predict the size and position of the occupant. The controller 102 may then further control actuation of the latch mechanism 48 to provide the energy absorption characteristics required for the sensed occupant. As another example, the seat belt tension sensor 120 may be used to detect the presence of a child safety seat.

The vents 38 of the air bag module 10 thus function in a passive mode in which the air bag 12 and tether 50 operate to place the vent in the closed condition depending upon actual occupant conditions, such as the position of the occupant relative to the air bag. Meanwhile, the latch mechanism 48 functions in an active mode in which the latch mechanism is actuated by the controller 102 to place the latch mechanism selectively in the actuated or unactuated condition based on sensed occupant conditions.

The controller 102 may be operative to sense vehicle and/or occupant conditions and place the latch mechanisms 48 in the actuated or unactuated condition independently of whether an event for which deployment of the air bag 14 has occurred. The controller 102 may thus operate in realtime, continuously evaluating data regarding the vehicle and/or occupant conditions provided by the sensors and actuating the latch mechanisms to the appropriate condition. For example, the controller 102 may be operatively connected to the seat belt latch sensor 116 and continuously monitor the condition of the seat belt while the vehicle is in operation. In this scenario, the controller 102 may be operative to place the latch mechanisms 48 in the latched condition whenever an unlatched condition of the seat belt is sensed, may be operative to place the latch mechanisms in the unlatched condition whenever a latched condition of the seat belt is sensed. In this scenario, the controller 102 would actuate the latch mechanisms 48 regardless of whether an event for which deployment of the air bag is sensed.

Figure 5:
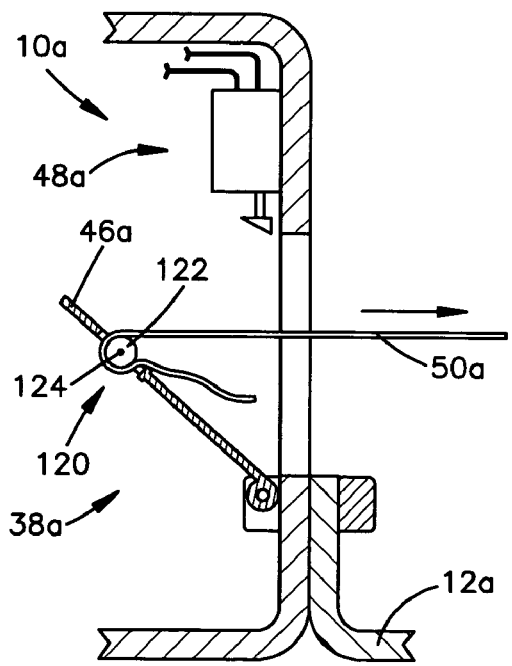
FIG. 5 is a magnified view of a portion of the apparatus of FIGS. 1 and 2, according to a second embodiment of the present invention.

A second embodiment of the present invention is illustrated in FIG. 5. The second embodiment of the invention is similar to the first embodiment of the invention illustrated in FIGS. 1–4. Accordingly, numerals similar to those of FIGS. 1–4 will be utilized in FIG. 5 to identify similar components, the suffix letter "a" being associated with the numerals of FIG. 5 to avoid confusion. The second embodiment of the present invention is similar to the first embodiment (FIGS. 1–4), except that the tether of the second embodiment is connected to the vent door by a velocity mechanism.

Referring to FIG. 5, the vent 38a of the air bag module 10a includes a velocity mechanism 120, supported on the vent door 46a, for receiving the tether 50a. The velocity mechanism 120 includes a spool 122 around which the tether 50a is looped. The spool 122 has an outer surface adapted to promote frictional engagement between the tether 50a and the spool. To achieve this frictional engagement, the outer surface of the spool 122 may, for example, include teeth or may be roughened.

The velocity mechanism 120 is configured to allow the spool 122 to spin freely about a central longitudinal axis 124 at an angular velocity below a predetermined level. The velocity mechanism 120 is further adapted to lock against rotation about the axis 124 when the angular velocity is at or above the predetermined level.

During inflation of the air bag 12a, the tether 50a is pulled by the air bag in the direction indicated by the arrow in FIG. 5. The tether 50a imparts rotational movement to the spool 122. Once the tether 50a is pulled at a velocity sufficient to cause the spool 122 to lock, the velocity mechanism 120 grabs onto the tether. When the velocity mechanism 120 grabs onto the tether 50a, further movement of the tether pulls the vent door 46a closed.

Figure 6A:
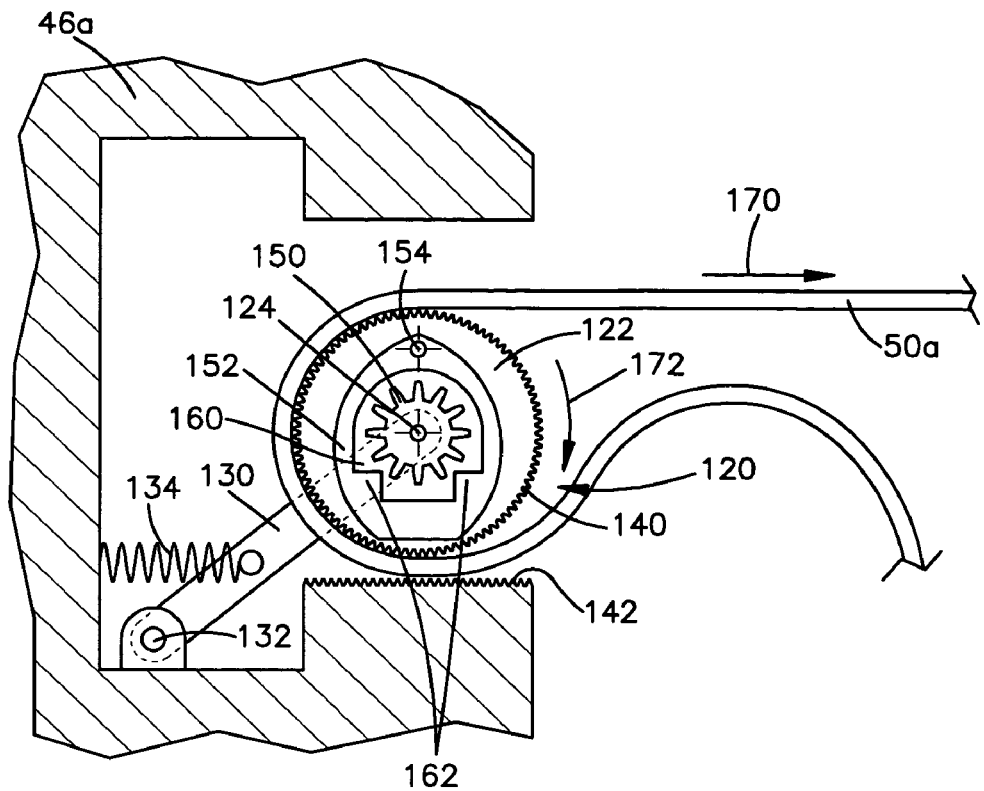
FIGS. 6A and 6B are magnified views of the portion of the apparatus of FIG. 5, with parts shown in different positions.
Figure 6B:
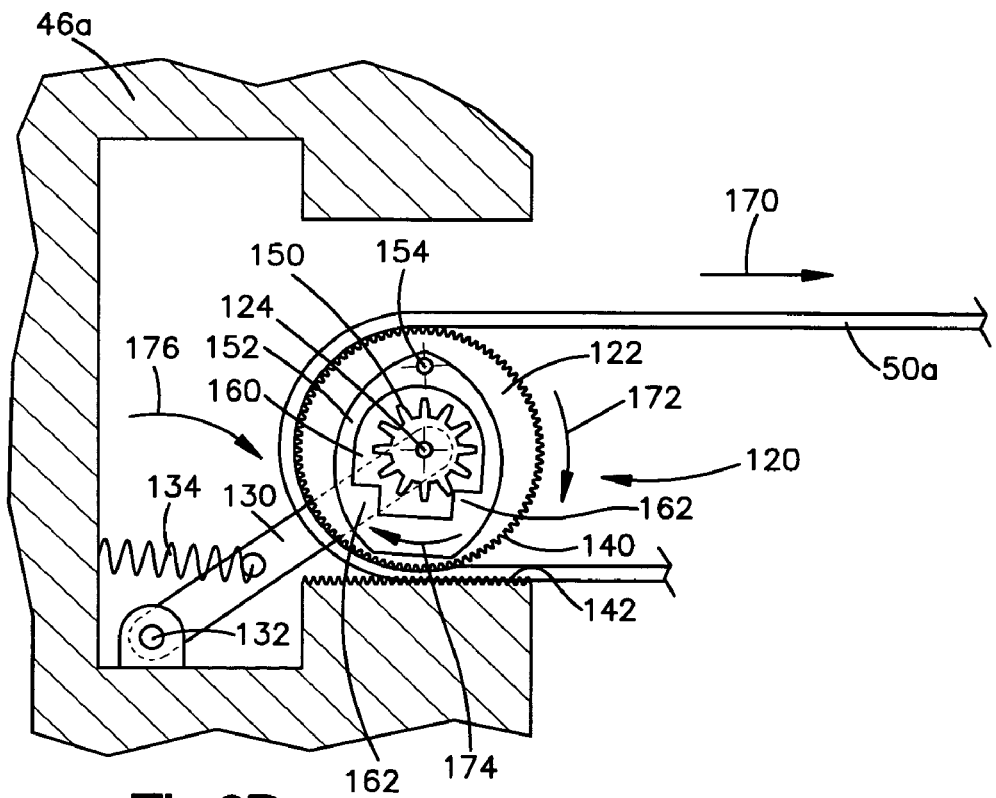

By way of example, a configuration for the velocity mechanism 120 is illustrated in FIGS. 6A and 6B. As shown in FIGS. 6A and 6B, the spool 122 is supported for rotation about the axis 124 on a pivot arm 130. The pivot arm 130 is pivotable about a pivot axis 132 and is biased to a retracted position illustrated in FIG. 6A by a spring 134. In the retracted position, there is a clearance between a toothed outer surface 140 of the spool 122 and a toothed surface 142 of the vent door 46a. This clearance is sufficient to allow the tether 50a to move freely between the toothed surfaces 140 and 142.

The velocity mechanism 120 also includes a cog 150 that is centered on the axis 124. The cog 150 is fixed and not permitted to rotate about the axis 124. A pawl 152 is fixed to the spool 122 and is pivotable about an axis 154 that is offset from the axis 124. The pawl 152 has a central cutout portion 160 that forms an inner surface on which a pair of teeth 162 are formed. The pawl is biased by means (not shown), such as a spring, to a normal position, illustrated in FIG. 6A. The cog 150 fits within the cutout portion 160 of the pawl 152.

When the pawl 152 is in the normal position of FIG. 6A, the teeth 162 are spaced from the cog 150. The spool 122 along with the pawl 152 is thus free to rotate about the axis 124. Therefore, when the tether 50a is tensioned in the direction indicated generally by the arrow labeled 170, the spool 122 rotates in the direction indicated generally by the arrow labeled 172.

As the spool 122 rotates about the axis 124, centrifugal and other forces act on the pawl 152, urging the pawl to pivot relative to the spool about the axis 154. When the spool 122 reaches a predetermined rotational speed, the forces acting on the pawl 152 become sufficient to overcome the spring bias maintaining the pawl in the normal position of FIG. 6A. As a result, pawl 152 pivots about the axis 154 against the spring bias toward a locking position, which is illustrated in FIG. 6B. This predetermined rotational speed may be selected in a variety of manners, such as altering the bias of the spring biasing the pawl 152 or altering the shape or mass of the pawl.

When the pawl 152 rotates in the direction 172 at or above the predetermined speed, the pawl 152 pivots in the direction indicated generally by the arrow labeled 174 to the locking position of FIG. 6B. As a result, one of the teeth 162 (i.e., the tooth on the right as viewed in FIG. 6B) engages the cog 150. Since the cog 150 is fixed against rotation about the axis 124, engagement of the pawl 152 with the cog blocks the spool 122 against rotation about the axis 124. Since the spool 122 is blocked against rotation, the tension on the tether 50a is transferred to the pivot arm 130. This tension urges the pivot arm 130 to pivot about the axis 132 against the bias of the spring 134.

The pivot arm 130 pivots about the axis 132 in a direction indicated generally by the arrow labeled 176 in FIG. 6B. As a result, the toothed surface 140 of the spool 122 moves toward the toothed surface 142 of the vent door 46a, closing the clearance and exerting a clamping force on the tether 50a. The velocity mechanism 120 thus grabs onto the tether 50a and the tension on the tether is transferred to the vent door 46a so that the door moves toward the closed condition (see FIG. 5). Increased tension on the tether 50a increases the clamping force exerted on the tether and thus increases the force with which the velocity mechanism 120 grabs the tether.

Those skilled in the art will appreciate that the velocity mechanism 120 may grab the tether 50a prior to the air bag 12a becoming fully inflated. Because of this, it may be desirable to connect the tether 50a to the air bag 12a using a releasable fastening means, such as tear stitches. As a result, once the vent door 46a is closed, increased tension on the tether 50a due inflation of the air bag 12a will cause the tear stitching to tear, thus releasing the air bag for further inflation.

Advantageously, inclusion of the velocity mechanism 120 allows the vent door 46a to be closed upon the tether 50a reaching the predetermined velocity instead of when the air bag 12a becomes fully inflated. The tether 50a reaching the predetermined velocity may indicate the presence of a clearance between the air bag module and the vehicle occupant sufficient to warrant closing the vent door 46a. Accordingly, the vent door 46a may thus be pulled closed immediately instead of when the air bag reaches its fully inflated condition. The vent door 46a, once closed, may be maintained closed or released to open by the latch mechanism 48a (FIG. 5) in the manner described above in regard to the first embodiment of FIGS. 1–4.

From the above description of the invention, those skilled in the art will perceive improvements, changes and modifications in the invention. Such improvements, changes and modifications within the skill of the art are intended to be covered by the appended claims.

We claim:

1. A vehicle occupant protection apparatus comprising:
    an inflatable vehicle occupant protection device inflatable from a deflated condition to an inflated condition;
    a vent opening for directing flow of inflation fluid away from said protection device;
    a vent member movable relative to said vent opening between an open condition enabling flow of inflation fluid away from said protection device through said vent opening and a closed condition at least partially blocking flow of inflation fluid away from said protection device through said vent opening;
    a tether associated with said protection device and said vent member, said tether, when tensioned, moving said vent member from the open condition to the closed condition;
    latching means having a latched condition for maintaining said vent member in the closed condition, said latching means also having an unlatched condition for preventing said vent member from remaining in the closed condition; and control means operative to actuate said latching means selectively to the latched condition and the unlatched condition based on at least one sensed occupant condition.

2. The vehicle occupant protection apparatus recited in claim 1, wherein said vent opening comprises an opening in a support member for said protection device.

3. The vehicle occupant protection apparatus recited in claim 2, wherein said support member comprises a reaction plate.

4. The vehicle occupant protection apparatus recited in claim 1, wherein said vent member comprises a door supported for pivotal movement relative to said vent opening between the open and closed conditions.

5. The vehicle occupant protection apparatus recited in claim 1, wherein said tether has a first portion connected with said protection device and a second portion connected with said vent member, said protection device while inflating pulling on and tensioning said tether, said tether when tensioned pulling said vent member from said open condition to said closed condition.

6. The vehicle occupant protection apparatus recited in claim 5, wherein said tether pulls said vent member from the open condition to the closed condition only in response to movement of said protection device away from said vent member a distance in excess of a predetermined distance.

7. The vehicle occupant protection apparatus recited in claim 5, wherein said tether has slack when said protection device is in the deflated condition, said slack being removed from said tether when said protection device moves a predetermined distance away from said vent member, said tether pulling said vent member from the open condition to the closed condition in response to movement of said protection device beyond said predetermined distance.

8. The vehicle occupant protection apparatus recited in claim 1, further comprising a velocity mechanism connecting said tether with said vent member, said velocity mechanism being operable to release said tether for movement relative to said vent member when said tether is pulled at a velocity below a predetermined velocity, said velocity mechanism being further operable to lock said tether against movement relative to said vent member when said tether is pulled at a velocity at or above said predetermined velocity.

9. The vehicle occupant protection apparatus recited in claim 8, wherein said vent member is maintained in the open condition when said velocity mechanism releases said tether for movement relative to said vent member.

10. The vehicle occupant protection apparatus recited in claim 8, wherein said tether pulls said vent member to the closed condition when said velocity mechanism locks said tether against movement relative to said vent member.

11. The vehicle occupant protection apparatus recited in claim 8, further comprising releasable connection means for connecting said tether to said protection device, said releasable connection means releasing said tether from said protection device when a predetermined amount of tension is placed on said tether.

12. The vehicle occupant protection apparatus recited in claim 1, further comprising buckle sensing means for sensing a buckled condition and an unbuckled condition of a seat belt of the vehicle, said buckle sensing means being operatively connected with said control means, said control means being operative to actuate said latching means to the latched condition upon sensing an unbuckled condition of said seat belt, said control means being further operative to actuate said latching means to the unlatched condition upon sensing a buckled condition of said seat belt.

13. The vehicle occupant protection apparatus recited in claim 1, further comprising occupant position sensing means for sensing the position of the vehicle occupant, said occupant position sensing means being operatively connected with said control means, said control means being operative to actuate said latching means to the latched condition upon sensing via the occupant position sensing means that the vehicle occupant is positioned in the normal seated position in the vehicle, said control means being further operative to actuate said latching means to the unlatched condition upon sensing via the occupant position sensing means that the occupant is positioned away from the normal seated position in the vehicle.

14. The vehicle occupant protection apparatus recited in claim 1, further comprising seat position sensing means for sensing the position of a vehicle seat, said seat position sensing means being operatively connected with said control means, said control means being operative to actuate said latching means to one of the latched and unlatched conditions depending on the sensed position of the vehicle seat.

15. The vehicle occupant protection apparatus recited in claim 1, further comprising seat weight sensing means for sensing the weight of an object in a vehicle seat, said seat weight sensing means being operatively connected with said control means, said control means being operative to actuate said latching means to one of the latched and unlatched conditions depending on the sensed weight in the vehicle seat.

16. The vehicle occupant protection apparatus recited in claim 1, wherein said control means is operative to actuate the said latching means to the unlatched condition when said at least one sensed occupant condition is indicative of an occupant positioned away from a normal seated position in the vehicle.

17. The vehicle occupant protection apparatus recited in claim 1, wherein said control means is operative to maintain said latching means in the latched condition when said at least one sensed occupant condition is indicative of an occupant is in a normal seated position without being restrained by a vehicle seat belt.

18. The vehicle occupant protection apparatus recited in claim 1, wherein said control means is operative to maintain said latching means in the latched condition long enough to inflate said protection device fully and then actuate said latching means to the unlatched condition to release said vent member to vent inflation fluid from said protection device when said at least one sensed occupant condition is indicative of an occupant in a normal seated position and restrained by a vehicle seat belt.

19. A vehicle occupant protection apparatus comprising:
an inflatable vehicle occupant protection device inflatable to deploy from a deflated condition to an inflated condition;
a vent opening for enabling flow of inflation fluid away from said protection device;
a vent member movable relative to said vent opening between an open condition enabling flow of inflation fluid away from said protection device through said vent opening and a closed condition at least partially blocking flow of inflation fluid away from said protection device through said vent opening;
a tether connected to said protection device, said protection device during inflation and deployment pulling on said tether; and a velocity mechanism for connecting said tether with said vent member, said velocity mechanism being operable to release said tether for movement relative to said vent member when said tether is pulled at a velocity below a predetermined velocity, said velocity mechanism being further operable to lock said tether against movement relative to said vent member when said tether is pulled at a velocity at or above said predetermined velocity, said tether being operative to move said vent member from the open condition to the closed condition when said protection device pulls on said tether and said velocity mechanism locks said tether.

20. The vehicle occupant protection apparatus recited in claim 19, further comprising:

actuatable latching means having a latched condition operable to maintain said vent member in the closed condition once said vent member is moved to the closed condition;

control means operative to actuate said latching means selectively between the latched condition and an unlatched condition based on at least one sensed occupant condition, said latching means when in the unlatched condition releasing said vent member to move to the open condition.

21. A vehicle occupant protection apparatus comprising:

an inflatable vehicle occupant protection device inflatable from a deflated condition to an inflated condition;

a vent opening for directing flow of inflation fluid away from said protection device;

a vent member movable relative to said vent opening between an open condition enabling flow of inflation fluid away from said protection device through said vent opening and a closed condition at least partially blocking flow of inflation fluid away from said protection device through said vent opening;

a tether associated with said protection device and said vent member, said tether, when tensioned, moving said vent member from the open condition to the closed condition;

latching means having a latched condition for maintaining said vent member in the closed condition; and control means operative to actuate said latching means selectively to the latched condition based on at least one sensed occupant condition.

* * * * *